United States Patent [19]
Comer

[11] Patent Number: 6,081,856
[45] Date of Patent: Jun. 27, 2000

[54] ADAPTER AND METHOD FOR EMULATING THE OPERATION OF A PERIPHERAL DEVICE OF A COMPUTER

[75] Inventor: Edward Irby Comer, Marietta, Ga.

[73] Assignee: BellSouth Intellectual Property Corporation, Wilmington, Del.

[21] Appl. No.: 08/982,766

[22] Filed: Dec. 2, 1997

[51] Int. Cl.[7] ............................. G06F 9/455; G06F 13/10
[52] U.S. Cl. ............................... 710/67; 710/62; 710/73; 703/24
[58] Field of Search .................................. 380/52, 23, 49, 380/25; 345/168, 172, 157, 161, 163, 166, 169, 156; 710/62, 67, 8, 10, 30, 65, 73, 101; 364/234, 570; 709/233; 235/435, 439; 395/500.35, 500.45, 500.46; 703/24; 455/73

[56] References Cited

U.S. PATENT DOCUMENTS

| | | | |
|---|---|---|---|
| 4,398,265 | 8/1983 | Puhl et al. | 364/700 |
| 4,839,802 | 6/1989 | Wonak et al. | 364/200 |
| 5,034,598 | 7/1991 | Poland | 235/435 |
| 5,214,785 | 5/1993 | Fairweather | 364/707 |
| 5,361,376 | 11/1994 | Cummins et al. | 364/DIG. 1 |
| 5,440,699 | 8/1995 | Farrand et al. | 364/DIG. 1 |
| 5,590,315 | 12/1996 | Hess et al. | 364/234 |

*Primary Examiner*—Daniel Pan
*Attorney, Agent, or Firm*—Jones & Askew, LLP

[57] ABSTRACT

A system, apparatus, and method for emulating the operation of a peripheral device of a computer. An adapter for communicating keyboard data to a computer via a data link and for communicating display data from the computer to an external device. The adapter eliminates the need for the peripheral device to be directly connected to the computer by enabling the computer to operate without the peripheral device while still receiving or generating the data normally processed by the peripheral device. The adapter presents itself to the computer as if the adapter were the emulated peripheral device. Thus, the operation of the adapter is transparent to the computer. A remote user can access the computer, via the adapter, by communicating keyboard data generated by the user on a keyboard at a remote location. The adapter communicates display data to the user at the remote location, so that the user can monitor the operation and output of the computer. The adapter provides access to the remote user at substantially all times that the computer is operative, including the time immediately following start-up of the computer. A method is also provided for enabling a computer to process keyboard data without having a keyboard directly connected to the computer. The method also enables the computer to transmit display data to an external device at substantially all times that the computer is operative, including the time immediately following start-up of the computer.

27 Claims, 6 Drawing Sheets

ADAPTER AND METHOD FOR EMULATING THE OPERATION OF A PERIPHERAL DEVICE OF A COMPUTER

TECHNICAL FIELD

The present invention generally pertains to the field of computers and more particularly pertains to the emulation of a peripheral device of a computer by means of an adapter and method that control the flow of electronic data.

BACKGROUND OF THE INVENTION

As computers have become concurrently more powerful and less expensive, the applications in which computers are utilized have become more diverse. Once largely confined to scientific or clerical applications, computers are now commonly being employed in a wider variety of applications. Because computers have become significantly less expensive, users can economically justify the use of computers in dedicated applications, where the computer is only responsible for a narrow set of tasks.

For example, many computers have been utilized as control devices, despite having the capacity to perform a much wider range of functions. A computer being utilized as a control device may be dedicated to the performance of a single task or a narrow set of tasks. For example, a computer might be required to monitor the voltage level from a temperature detecting device and compare that to some predetermined level. In this example, the computer might be programmed to trigger a cooling system if a particular threshold temperature is reached; create an alarm signal if the temperature is not reduced within a predetermined time period; or transmit a status report via a telephone line.

The versatility and low cost of computers has made them desirable for dedicated tasks, because most users can readily program a computer to accommodate changed conditions or changed objectives. On the other hand, many of a computer's capabilities go unutilized in a dedicated task application.

Often, a dedicated computer is utilized in an application where the computer is "embedded" within a system and serves as a component of that system. The system may require the computer to perform a specific task or generate specific output, in order for the system to perform a larger set of tasks. Examples of such applications include the use of a computer as a network server, as a controller for industrial equipment, and as a component of a private branch exchange (PBX) telephone system. Commonly, an embedded computer must be monitored and controlled by the system or another external device, in order to coordinate the computer's operation with the operation of the system.

Where an embedded computer is needed for a particular application, such as for a PBX system, the computer best suited for the application is often a commercially available (i.e., off-the-shelf), general purpose microcomputer. Such a microcomputer is suitable as an embedded computer, because it is inexpensive, sufficiently powerful, and readily adaptable for immediate implementation. Most commercially available microcomputers are extremely versatile, permitting re-programming when necessary to accommodate changed circumstances or objectives. Moreover, software is readily available for such microcomputers to perform a wide variety of tasks. Even in cases where the embedded application requires a very narrow set of tasks, the relatively low cost of a commercially available microcomputer often makes it preferable to a dedicated-task computer. A dedicated-task computer must be designed, manufactured, and programmed before it is ready for implementation. Because it is not mass-produced like commercially available microcomputers, the dedicated-task computer is relatively more expensive. Furthermore, any changed circumstances or objectives may require an expensive re-design of the dedicated-task computer.

Accordingly, designers of embedded systems applications tend to incorporate commercially available computers where possible, to increase efficiency, flexibility, and interchangability of the embedded computer. In many cases, the presence of peripheral devices, such as an attached keyboard or attached video monitor, may be unnecessary for or detrimental to the operation of an embedded computer. Alternatively, an embedded computer's need for such a peripheral device may be so limited that another device may be used as a substitute for a particular peripheral device, when the occasional need arises. Emulation is a means, well known to those skilled in the computer arts, of monitoring and controlling a computer and/or its peripheral devices. Emulation also may include communication with a computer that simulates the operation of one or more of the computer's peripheral devices. Emulation can be effected by external devices such as another computer, a remote computer communicating over a modem and telephone line arrangement, a computer network, or any other device or set of devices equipped to communicate with a computer.

In this context, a peripheral device can be any device functionally connected to the central processing unit of a computer, such as a keyboard, video monitor, mouse, or printer. Emulation may involve communicating control or data messages from an external device to the computer to substitute for the messages that otherwise would be communicated from the absent, emulated peripheral device. For example, an external device may communicate signals to the computer and these signals may simulate the operation of a keyboard. In such an arrangement, the external device might simulate the keystrokes that would otherwise be generated by a user typing on a keyboard attached to the computer.

Another example is the emulation of a video monitor. An external device might be utilized to retrieve and exhibit the display data of the computer by receiving data communications from the computer. In either example, the external device might "present itself" to the computer as the peripheral device. That is, the computer interacts with the external device as if the external device were the absent peripheral device. Because the computer is "unaware" that the external device is not actually the peripheral device, there may be no need to modify the operation of the computer itself. Therefore, where a goal is to minimize modification of a computer's normal operation, the better means of emulation is by the use of a device which presents itself to the computer as the peripheral device. If the display data available to the external device, for example, a remote video monitor, is substantially identical to the display data available to a video monitor directly connected to the computer, then the remote video monitor may generate a screen image substantially identical to that which would be generated by a video monitor connected to the computer.

One of the challenges presented to a computer user, attempting to emulate one or more of a computer's peripheral devices, is to enable emulation while minimizing interruption of the computer's other functions. Therefore, it is a goal for the external device to communicate with the computer in a manner substantially identical to the manner by which the absent, emulated peripheral device would otherwise have communicated with the computer. Negating the need for intermediate steps, such as a translation step, helps to minimize interruption of the computer's operations. For example, where the emulation of a keyboard is desired, the communication between the external device and the computer might be in a format substantially identical to the keystroke data ordinarily generated by a keyboard connected to the computer.

Several devices and methods have been proffered as solutions to the problems presented by computer peripheral emulation. One such method requires the modification of the computer's initialization procedure, which is typically stored in the read-only memory (ROM) of the computer. Among other things, a computer's initialization procedure can configure the data flow of the computer; thereby directing the computer where to send output data and from where to receive input data. Modification of the computer's initialization procedure may reconfigure the computer so that it can accept data from a source or port different than the source or port identified in the computer's unmodified initialization procedure. In the case of keyboard data, for example, such a reconfiguration could direct the computer to "look for" keyboard data from a serial communications port, rather than from the computer's keyboard port. Similarly, the reconfigured initialization procedure could be modified to redirect display data to a serial communications port, rather than the video monitor port.

One problem with modification of the initialization procedure is that it is not portable to other computers with different initialization procedures. Each computer with a different initialization procedure would require individual modification in order to be properly reconfigured to perform the desired emulation operations. Additionally, modification of the initialization procedure would require replacing computer hardware or firmware (e.g., a ROM chip). Modification of the initialization procedure by such a method would be expensive and impractical, if not impossible, for most computer users. Moreover, once the initialization procedure had been so modified, an equally impractical hardware/firmware replacement would be required to return the computer to its original state of operation.

Another problem with modifying the initialization procedure is that it would redirect only those computer operations that employed the initialization procedure as a source of data flow control information. Assume, for example, that a specific program is running on the computer which utilizes the computer's peripherals. Assume further, that the specific program communicates directly with the computer's peripherals, bypassing the data flow directions of the initialization program. In such an instance, modification of the initialization procedure would have no effect on the operation of the computer running this specific program. Therefore, any attempts to enable emulation of the peripherals by modification of the initialization procedure would be thwarted.

Another emulation method involves the redirection of the computer's peripheral operations by sending commands to the computer's operating system. At startup, this method performs redirection only after the initialization procedure has been completed and the operating system has assumed control of the computer. A problem with this method is that any data generated by the computer, prior to the operating system's assumption of control, will not be made available to the external device. Commonly, computers generate display data, containing error messages to the user, during the execution of the initialization procedure. If an external device, such as a remote video monitor, is required to wait until after execution of the initialization procedure to receive display data from the computer, then the error message would not be displayed in a timely manner. If the error message indicates that some action is required by the user in order to continue execution of the initialization procedure, then the operating system might never be enabled. In a situation where the user is monitoring a computer solely by means of an external device (e.g., a remote computer), the user might not realize that such an error had occurred until it is too late to provide an appropriate remedy.

A device that has been proffered as a solution to some of the problems presented by computer emulation enables a "remote" computer to emulate the keyboard data input and display data output of a "local" computer. This device presents itself to the local computer as an expansion card and performs all emulation functions via the local computer's data bus. The device permits a user of the remote computer to insert keyboard data into the local computer's keyboard controller via the local computer's data bus.

Unfortunately, this device cannot process keyboard data received from the remote computer until the operating system is enabled. In a situation where, as discussed above, an error occurred before or during the execution of the initialization procedure, the remote computer user would be incapable of reacting to the error by means of the remote computer until the initialization procedure had turned control of the local computer over to the operating system. Additionally, this device's use of the local computer's data bus will reduce the efficiency of the local computer's operation. By transmitting keyboard data over the local computer's data bus, this device increases the number of operations the local computer must perform, thereby delaying the processing of other operations.

The use of the computer's data bus for keyboard data transmission reduces the portability of this device from one computer to another. For example, the device may be configured to access a particular area of the local computer's memory as a keyboard data buffer. Where the memory location of this particular area varies from one computer to another, the device would require reconfiguration to be portable between these computers. Similarly, the communications protocol for transmitting keyboard data on the system bus must be matched to the standard protocol of the local computer. If the protocol differs from one computer to another, then the device may need reconfiguration in order to be moved from one computer to the other.

In sum, the devices and methods proffered as solutions to the problem of computer peripheral emulation have various shortcomings. Some do not enable emulation at substantially all times that the computer is operative. Some fail to preclude circumvention of the emulation process by programs directly communicating with peripheral devices. Some require that the emulated peripheral devices be present (i.e., directly connected to the computer) in order to effectively emulate those devices. Others are not portable between computers, requiring reconfiguration of the method, device, or the computer itself. Still others require the computer to perform additional steps, thereby reducing the efficiency of the computer's operation. In almost all cases, the computer itself must be configured to accommodate the emulation method, making the use of commercially available microcomputers impossible.

SUMMARY OF THE INVENTION

The present invention solves the problems of the prior art by providing an apparatus and a method, for emulating a peripheral device of a computer, that eliminates the need for the emulated device and provides emulation at substantially all times that the computer is operative.

Briefly described, one aspect of the present invention is an adapter for emulating the operation of a computer's peripheral devices. In one embodiment, the adapter may be used to emulate the operation of a keyboard. The adapter has a controller and a data link, that receive keyboard data from an external device, such as a modem, and provide that keyboard data to the computer. The adapter's data link is functionally connected to the computer's keyboard port and provides the keyboard data to the computer's keyboard port at substantially all times that the computer is operative, including during system start-up. Thus, the computer enables the computer's keyboard port, permitting the transmission and reception of the keyboard data from a source other than a keyboard.

The adapter also can receive output data from the computer and transmit the output data to an external device. For example, the adapter can transmit display data to an external device. Where the transmitted output data is display data, the adapter can provide other features including processing the display data to enable a substantially identical representation of the display data on an external device such as a remote video monitor.

The adapter also can utilize an interface to provide communications between the controller and the external device. This interface can be operative to communicate keyboard data as well as display data generated by the computer. Thus, the interface can communicate data in two directions.

By use of the present invention, display data can be retrieved from the computer's memory. The adapter can also compare sequential "screens" of display data, in order to transmit only the differences that occur. To do this, the adapter has a memory that is divided into a now buffer and a previous buffer. The adapter can store the computer's current display data in the now buffer and compare the now buffer to the previous display data stored in the previous buffer. By transmitting display data only when a difference occurs, the adapter minimizes transmission requirements between the adapter and the external device.

For another aspect of the present invention, an adapter is provided for electronically identifying itself as if the adapter were a keyboard. In some computers, communication between the keyboard port and the computer's keyboard are enabled only after completion of an identification procedure by the computer. The adapter can transmit an identification signal in response to an identification request, thereby electronically identifying itself as a keyboard. The adapter is thus able to eliminate the need for an attached keyboard in such computers.

In another aspect of the present invention, a method is provided for processing keyboard data without an attached keyboard. The method provides for the reception of keyboard data from an external device. The method provides the keyboard data to the computer at substantially all times that the computer is operative. The method also can transmit display data differences by comparing sequential sets of display data. The method also provides for the conversion of the keyboard data and the display data between data communication formats.

For another aspect of the invention, a system is provided for providing a computer with keyboard data, despite the fact that the computer does not have an attached keyboard. In this aspect of the invention, the system includes a computer with an adapter, which is operative to transmit keyboard data to the keyboard port of the computer. The adapter has a data link, which is directly connected to the keyboard port of the computer. This direct connection causes the computer to enable the computer's keyboard port, because the data link "appears" to be a keyboard. Because of this direct connection, the adapter provides keyboard data to the computer at substantially all times that the computer is operative.

This system also can transmit display differences to an external device by comparing sequential sets of display data. The system also provides for the conversion of the keyboard data and the display data between data communication formats.

In view of the foregoing, it is an object and advantage of the present invention to provide an adapter for emulating a peripheral device of a computer, so that the adapter eliminates the need for the emulated device and so that the adapter is operative at all times that the computer is operative.

It is another object and advantage of the present invention to provide an adapter for emulating a keyboard so that a computer can receive keyboard input and yet the computer can be operated without an attached keyboard.

It is another object and advantage of the present invention to provide an adapter for emulating a video display monitor so that a computer's video display output can be accessed and yet the computer can be operated without an attached video monitor.

The features and advantages of the present invention may be more clearly understood and appreciated from a review of the following detailed description and by reference to the appended drawings and claims.

DETAILED DESCRIPTION

Figure 1:
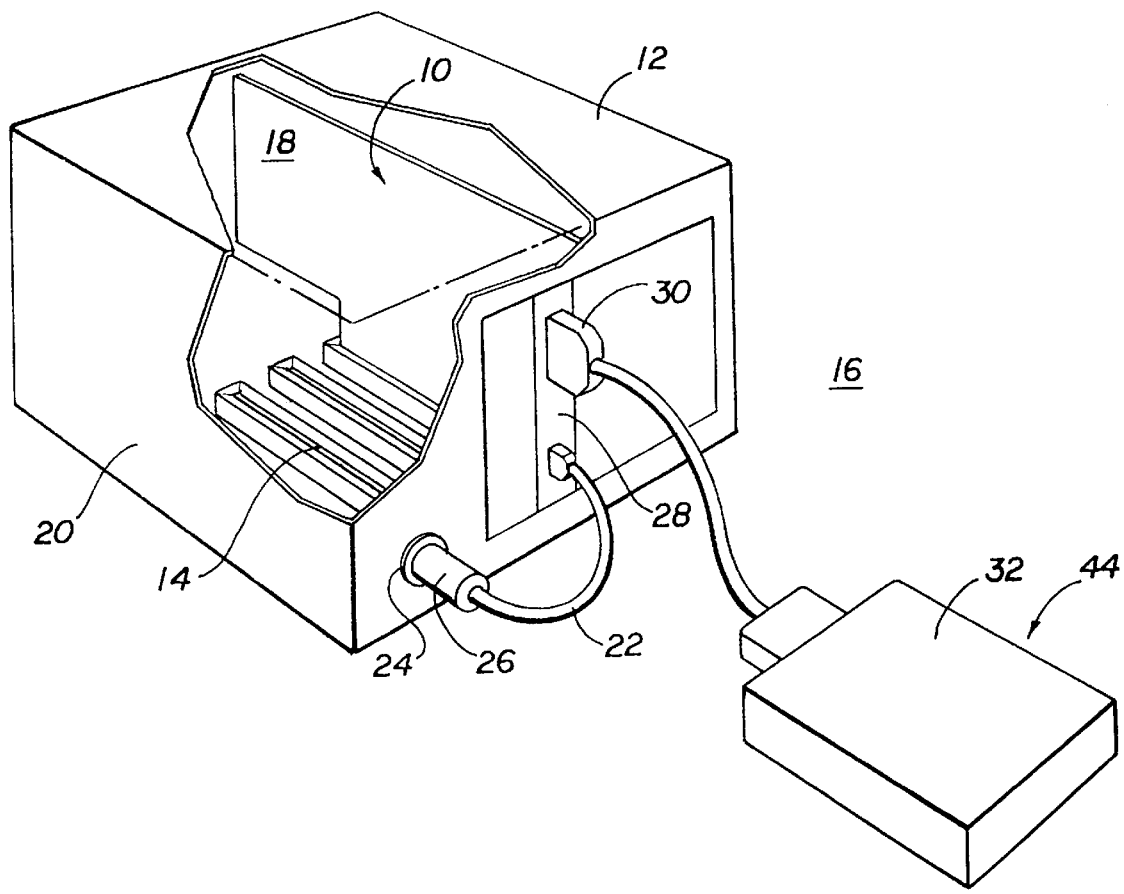
FIG. 1 is a pictorial view of an exemplary embodiment of an expansion card adapter in the operating environment of a computer.

The present invention is most valuable where a computer user needs to operate a computer without an attached keyboard or video monitor. A prime example of this need is presented by the case where a commercially available microcomputer is utilized to control telephone switching equipment. In telephone switching applications, the microcomputer is often embedded within a larger control system and physically located in a telephone control room. Commercially available microcomputers are preferable to specially designed dedicated-task computers, because of the low cost, ready availability, and flexibility of commercially available microcomputers. Often, telephone switching applications involve the location of the microcomputer in a confined control room in which space is limited and valuable. The space requirements of the microcomputer can be minimized by eliminating the keyboard and video monitor. For the vast majority of the microcomputer's operating time, the keyboard and monitor are unnecessary for operation of the microcomputer in such an application.

Unfortunately, virtually all commercially available microcomputers are not designed to be operated without a keyboard or video monitor. In order to capitalize on the benefits of commercially available microcomputers, a modification must be made to reduce the space requirements of the microcomputers. While permitting the elimination of the keyboard and the video monitor, the modification must also permit the use of an external computer to function as a terminal, thereby providing the keyboard input and the video monitor output in the limited instances where such input/output (I/O) is required. Prior to this invention, simple and inexpensive modification methods were unavailable.

In general, one embodiment of the invention is a system for processing keyboard data so that the operation of a keyboard can be emulated. This system eliminates the need for a keyboard directly attached to the computer and permits the computer to receive keyboard data input from another source as if the other source were an attached keyboard. In this embodiment of the invention, the system utilizes an adapter which enables the user to use an external device (e.g., another computer) to transmit keyboard data to a computer to which the adapter is functionally connected. The system delivers the keyboard data to the computer in a format that is comprehensible to the computer. If necessary, the system may convert the user's keystrokes into keyboard data for transmission and then back into keystroke data for delivery to the computer.

The system enables the computer to be used without a keyboard, at all times that the computer is operational. To do so, the adapter presents itself to the computer as a keyboard and the transmission of keyboard data is enabled at all times that the computer is accepting keyboard data. In one kind of computer, this is accomplished by connecting the system's adapter directly to the computer's keyboard port. In this kind of computer, the computer enables its keyboard port by checking the port's communication capabilities during an initialization procedure. Where the keyboard port is not communicating properly, this kind of computer may disable the port until re-initialization or even terminate the initialization procedure. To avoid such disablement, the adapter provides the necessary connection to the keyboard port to complete the initialization procedure and to enable the keyboard port for subsequent communications. Additionally, the adapter may transmit a signal to the computer identifying itself as if the adapter were an attached keyboard.

This embodiment may be enhanced by additional features. For example, the adapter also may be operative to emulate the operation of a video monitor or any other peripheral for processing output data. This additional feature permits this embodiment to provide a user with the output data in the form of display output of the computer, even though there is no video monitor directly connected to the computer.

In some computers, output data is generated as display data, which is stored in a particular area of the computer's memory. A video card may be utilized in this kind of computer to access the display data in the computer's memory, and to transmit the display data to a video monitor for display. In this kind of computer, the video card may access the display data in the computer memory by means of the computer's data bus. Simply put, the data bus provides a means for transferring data from the computer's memory to any device with access to the data bus. In an exemplary embodiment of the present invention, the adapter may retrieve the display data from the computer memory, via the data bus and then transmit the display data to an external device.

For example, in the case where, as described above, the user is transmitting keyboard data to the computer, this embodiment can provide the display data necessary to depict the characters as the user is typing them. Despite the fact that the user may be in a location geographically distant (i.e., remote) from the computer, the adapter allows the user to transmit keyboard data and to receive display data. By enabling the emulation of the keyboard and video monitor of the computer, the adapter allows the remote user to access the computer as if the user were in the same room as the computer, using an attached keyboard and attached video monitor.

As discussed above, many embedded computers are utilized in applications wherein the computer must be accessed by a remote user. Often, an embedded computer is located in an area that is inhospitable to humans or in a confined area to which user access is difficult. The exemplary embodiments of the present invention, described herein, provide remote access to the computer through emulation of the computer's peripheral devices. Moreover, the present invention permits the computer to be operated without having the emulated devices attached. In the system described above, the computer may be operated without a keyboard, without a video monitor, and even without a video card. This advantage saves money, space requirements, and reduces the potential for unwanted input or output.

Returning to the telephone switching example, a maintenance illustration highlights some of the attributes of an exemplary embodiment of the invention. The embedded computer, that is confined to the control room and is without a keyboard and monitor, can be serviced through the use of the present invention. A service technician can visit the control room and attach a portable computer to a serial port (interface) on the adapter, which is installed in the embedded computer. By placing the portable computer in a terminal mode, the technician can emulate the keyboard and video monitor which might otherwise be attached to the embedded computer. The technician can then start-up (boot) the embedded computer and begin receiving screen images (display data) from and begin sending input (keyboard data) to the embedded computer. Thus, the service technician can emulate the functions of the keyboard and video monitor at a very low level (i.e., directly after boot). This low-level access enables the technician to access and remedy any error conditions throughout the entire boot process and at all times thereafter that the computer is operative.

Referring now to the drawings, in which like numerals indicate like elements throughout the several views, an exemplary embodiment in which the adapter 10 presents itself to a computer as an expansion card shall now be discussed in detail.

An Expansion Card Embodiment

Referring first to FIG. 1, the adapter 10 is shown in an exemplary environment, wherein it presents itself to a computer 12 as an expansion card. A computer 12 can be equipped with expansion slots 14 into which a user can insert an expansion card. Expansion cards are often circuit boards, designed to be easily installed into a computer 12, by a user. Expansion slots 14 may allow the computer 12 and the expansion card to communicate so that the expansion card can be utilized to operate in concert with the computer 12 to perform operations that the computer 12, alone, could not. For example, an expansion slot 14 might enable an expansion card to have direct access to the computer's memory, thereby permitting the expansion card to display portions of the computer memory on a video monitor. The use of expansion cards to complement the operations of a computer is well known to those skilled in the computer arts.

The embodiment in which the adapter 10 presents itself to a computer 12 as an expansion card is but one embodiment of the invention. Those skilled in the computer arts will recognize that a number of different embodiments could be employed to work the invention. Many computers are not equipped with expansion slots, but are cooperative with other means of complementing their operations. Examples of such alternative embodiments include incorporating an embodiment of the invention into the built-in circuitry of a computer, implementing the invention as a device completely external to a computer, or any other means of implementing the emulation taught by the present invention.

One advantage to the expansion card embodiment of the adapter 10 is that it provides ready access to the computer's memory and the data therein. Because a desired function of an exemplary embodiment of the adapter 10 is to emulate a video monitor, access to the computer's display data may be desirable. Often, a computer 12 stores display data in memory locations that are accessible via the computer's data bus. Expansion slots can provide access to the computer's memory by virtue of being functionally connected to the computer's data bus. Where an expansion card 18 is inserted into such an expansion slot 14, the data bus can be utilized by the expansion card 18 to gain access to the computer's memory. In one embodiment, the adapter 10 may be configured to access a particular part of the computer's memory in order to obtain the display data needed to reproduce the computer's video output, thereby enabling emulation of a video monitor. Use of the computer data bus as a means of access to computer display data is known to those skilled in the computer arts. A device commonly utilized to enable such access is the Motorola 6845 CRT controller chip, manufactured by Motorola, Schaumburg, Ill.

Another advantage to the expansion card embodiment is that it enables the adapter 10 to be active at substantially all times that the computer is operative. Because the adapter 10 is directly connected to the computer's data bus, the adapter 10 has access to the computer's data as soon as the computer is booted-up. Where the adapter is used to transmit display data, the importance of this feature is manifest. When the computer is booted-up, the remote user is immediately able to receive display data from the computer. If, for example, an error message is generated by the computer in the form of display data, the remote user would be ignorant of the error message, were the display data not immediately available for transmission to the remote user's location. Since, this feature makes the error message immediately available, the remote user may take appropriate remedial action in response to the message. There are other means of enabling the present invention to be operative at substantially all times that the computer is operative, the expansion card embodiment is used for the purposes of illustrating the advantage of this feature of the present invention.

Usually the expansion slots 14 in a computer 12 will be located within the interior of the computer's case 20. Expansion slots 14 are often located such that a portion of an installed expansion card 18 is accessible from the exterior 16 of the computer 12. Such an arrangement allows the expansion card 18 to be connected to other devices. In an exemplary embodiment of the invention, one edge 28 of the adapter 10 is exposed to the exterior 16 of the computer 12 and allows the adapter 10 to be linked to various other devices. Still referring to FIG. 1, the adapter 10 is shown with two connectors on its exposed edge 28. The first connector is the data link 22. The second connector on the exposed edge of the adapter 10 is the interface 30.

Referring to the first of these connectors, the data link 22 provides a connection between the adapter 10 and the keyboard port 24 of the computer 12. As will be discussed in more detail below, this connection allows the adapter 10 to send keyboard data directly to the keyboard port 24 of the computer 12. This connection also permits the computer 12 to enable communication with the keyboard port 24 during the initialization procedure following boot-up of the computer. Often, a computer's initialization procedure requires that a keyboard connector 26 actually be connected to the computer's keyboard port 24 before the computer 12 enables communication via the port. Where a keyboard connector 26 is not connected to such a computer, the keyboard port 24 is disabled during the initialization procedure. Thus, a subsequent connection is ignored by the computer 12, until the initialization procedure is repeated with the connection in place. Advantageously, in an exemplary embodiment, the data link 22 obviates the need for a keyboard, because the data link 22 provides a connection sufficient to enable the keyboard port 24, during the computer's initialization procedure.

Additionally, some computers may require that the keyboard electronically identify itself as a keyboard. The computer may transmit a signal requesting such an electronic identification via the computer's keyboard port. Consequently, the keyboard may send a responsive signal containing some electronic identification code. The adapter may be configured to generate such a responsive electronic identification, when the adapter receives such a request from the computer. An exemplary embodiment of the adapter may accomplish this electronic identification through communications via the data link 22.

As noted, the expansion card embodiment of the adapter preferably includes the data link 22 as a first connector, and the interface 30 as a second connector. The interface 30 provides a connection between the adapter 10 and an external device 44, depicted as a modem, 32. In one embodiment of the invention, the interface 30 may provide a serial communications link to external devices that are equipped to perform serial communications. One example of an interface 30 is the RS-232 port with which DB-25 and DB-9 male serial connectors are commonly used to connect computers to peripheral devices. Such serial communication interfaces are well known to those skilled in the art.

Examples of external devices are modems, other computers, computer networks, or any combination of these devices. The embodiment depicted in FIG. 1 depicts a modem 32 as an external device connected to the interface 30. In a similar embodiment, the modem 32 could be connected via telephone line to another modem, which is itself connected to a remote computer. In such a case, both modems, the remote computer and the telephone system are referred to as the external device. Of course, different implementations of the present invention may call for different interfaces. For example, where the external device was relatively close to the computer, a parallel interface, rather than a serial interface, may be appropriate.

An Embodiment For Keyboard and Video Monitor Emulation

Figure 2:
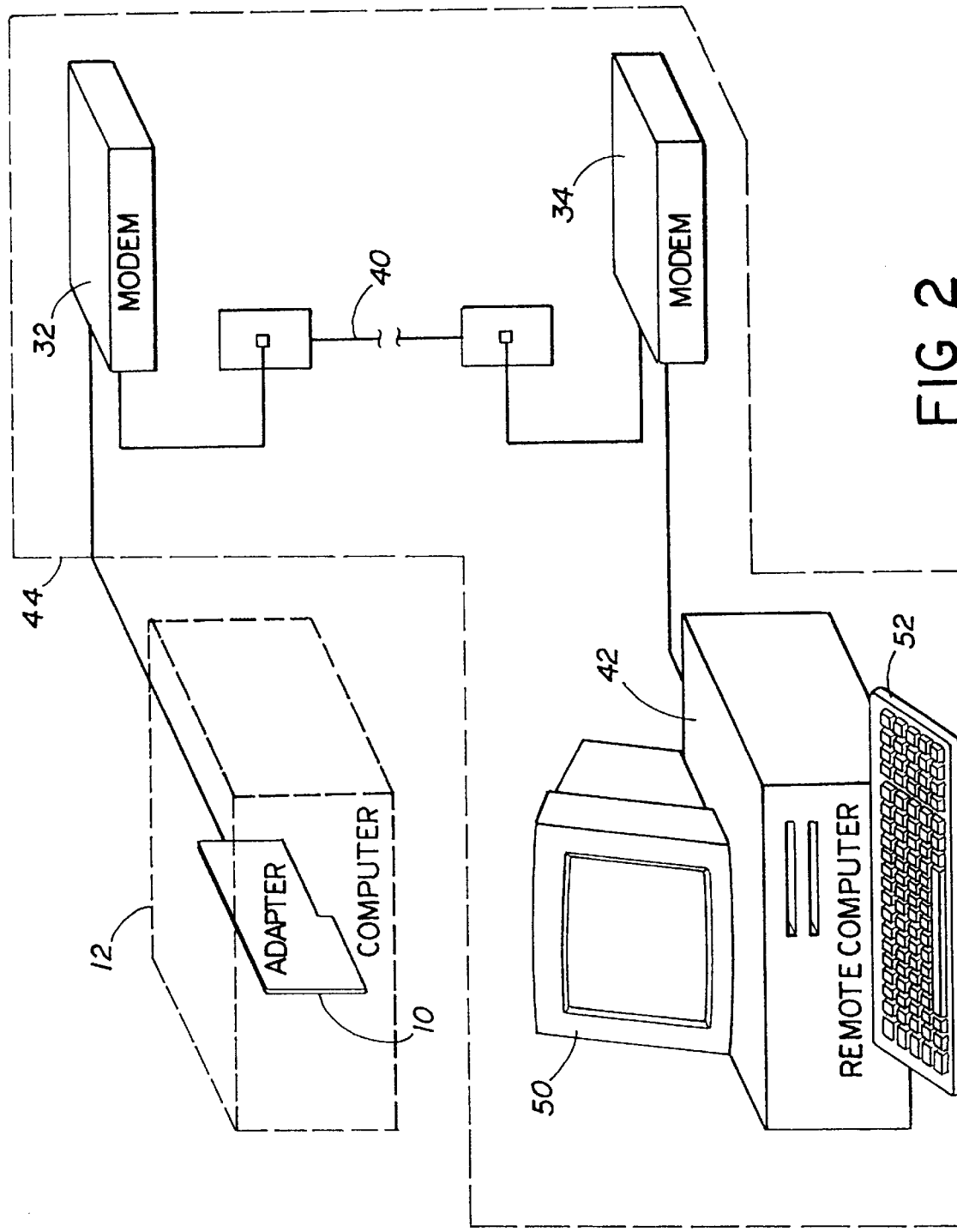
FIG. 2 is a pictorial view of an exemplary embodiment of an expansion card adapter in the operating environment of a computer and an external device including a remote computer and a telecommunication connection.

Referring now to FIG. 2, the adapter 10 is shown in an exemplary environment, in which the external device 44 consists of a modem 32, communicating over a standard telephone line 40 with a remote modem 34 and a remote computer 42. In this embodiment, the adapter 10 may enable the remote computer 42 to emulate the operation of various peripheral devices of the computer 12. For example, this embodiment might be utilized to enable the remote computer 42 to emulate the operation of a video monitor that might otherwise be attached to the computer 12. This embodiment might also be used to enable the remote computer 42 to emulate the operation of a keyboard that might otherwise be attached to the computer 12.

Referring still to FIG. 2, emulation of a video monitor can be effected by configuring this embodiment of the adapter 10 to read a portion of the computer's memory that contains the computer's display data. The adapter 10 then analyzes the display data to determine whether any differences exist, since the last time the adapter read the memory. Any differences detected by the adapter 10 indicate that a new video image has been generated by the computer 12. The adapter 10 transmits the display data to the remote computer 42 via the modem-to-modem connection described above. The remote computer 42 then utilizes the display data to generate a video image on the remote video monitor 50. By transmitting a succession of display data differences, this embodiment of the adapter 10 causes the remote video monitor 50 to generate the video output that might otherwise be generated by a video monitor directly connected to the computer 12.

In an exemplary embodiment of the adapter, the adapter 10 analyzes the computer's 12 display data output for differences in the following way. The adapter 10 periodically compares the current contents of the computer's 12 video memory with a copy of the previously read contents. Differences are converted into ASCII (American Standard Code for Information Exchange) text strings and ANSI 3.64 (American National Standards Institute) escape sequences suitable to approximate the placement and appearance of the display data were this data to be output to a video monitor connected directly to the computer 12. The converted differences are then transmitted via the telephone line connection 40 to the video display monitor 50 of the remote computer 42. The modems 32, 34 in conjunction with the telephone communications line 40, provide an ASCII serial communications link which provide the means for communicating the ASCII text strings and ANSI escape sequences between the adapter 10 and the remote computer 42. In this embodiment, the remote computer 42 can be either an ANSI 3.64 compatible terminal or a computer equipped with ANSI 3.64 terminal emulator software. Those skilled in the art are familiar with this form of display data transmission and will appreciate that it represents but one form of representing the output data of a computer. A detailed description of the method of processing the display data is provided below, in connection with FIGS. 4 and 5.

Referring still to FIG. 2, emulation of a keyboard can be effected by configuring this embodiment of the adapter 10 to transmit keyboard data from the remote computer 42 to the keyboard port 24 of the computer 12. A user at the remote computer 42, could type on the remote keyboard 52 and thereby cause the adapter 10 to emulate a keyboard attached to the computer 12. The adapter's 10 data link 22 is connected directly to the computer's keyboard port 24 in this embodiment. Consequently, the adapter 10 can emulate the operation of a keyboard such that the effect of the remote user's keystrokes on the remote keyboard 52 is identical to keystrokes on a keyboard directly connected to the computer's keyboard port 24. A more detailed description of an exemplary method of processing the keyboard data is provided below in connection with FIG. 6.

The adapter thus enables the computer to operate without an attached keyboard. As described above, an exemplary embodiment of the adapter may electronically identify itself to the computer as a keyboard. This is yet another way that the present invention can eliminate the necessity for the emulated peripheral device; in this example, a keyboard.

As noted in connection with FIG. 1, the adapter 10 is operative to perform the described functions at substantially all times that the computer 12 is operative. Thus, in an exemplary embodiment of the present invention, wherein the adapter is emulating the operation of a keyboard and of a video monitor, the adapter may transmit display data and receive keyboard data at substantially all times that the computer is operative. Advantageously, this feature allows a remote user to access the computer as soon as the computer is operative to transmit and receive such data, including during start-up procedures.

A Microprocessor-Based Embodiment

Figure 3:
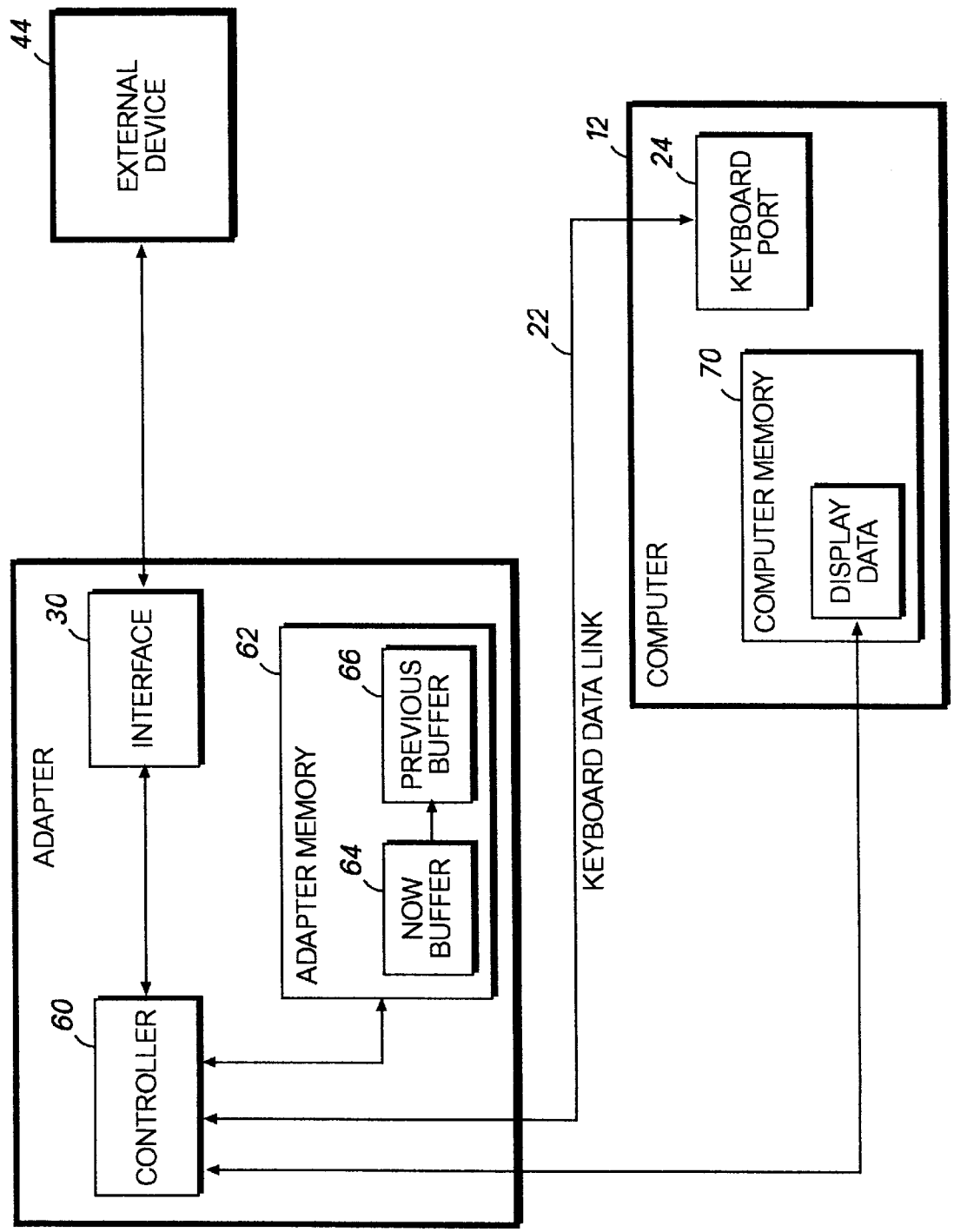
FIG. 3 is a block diagram of the components of an exemplary embodiment of an adapter in the operating environment of a computer and an external device.

Turning now to FIG. 3, an exemplary embodiment of the adapter 10 is shown in block diagram form. The block diagram depicts the components of this microprocessor-based embodiment of the adapter 10. Generally, this embodiment of the invention includes a controller 60 for controlling the operations and data flow of the adapter; a data link 22 for enabling the adapter to communicate with the computer's 12 keyboard port 24; an interface 30 for enabling the adapter to communicate with an external device 44; and an adapter memory 62 having a now buffer 64 and a previous buffer 66 for storing display data.

Where the adapter 10 is implemented as an expansion card, it may have access to the computer's data bus via the computer's 12 expansion slot 14. As described above, in connection with FIG. 2, the expansion card embodiment may also be connected to the computer's 12 keyboard port 24. The controller 60 is functionally connected to all other components of the adapter. Data communication between the adapter 10, the computer 12, and an external device is controlled by the adapter's 10 controller 60. In one embodiment, this arrangement may be used to communicate keyboard data from an external device to the keyboard port 24 of the computer 12. Similarly, this arrangement may be used to communicate display data from the computer's 12 memory to the external device 44. An exemplary embodiment of the adapter 10 implements the controller 60 as a microprocessor-based control system that can be programmed to conduct control operations in a manner known in the computer arts. The controller 60 can also control all other operations of the adapter 10 including data processing and data conversion.

Where the adapter 10 is utilized to emulate the operation of a video monitor, the controller 60 may control display data flow from the computer 12 to the external device 44. First, the controller 60 reads the computer memory 70, via the computer data bus, and retrieves the display data therefrom. Next, the controller 60 stores the display data in the now buffer 64 portion of the adapter memory 62. The controller 60 can then compare the display data in the now buffer 64 with the previous display data in the previous buffer 66 portion of the adapter memory 62. The previous buffer 66 contains the previous display data that was retrieved from the computer memory 70, prior to the last buffer comparison. By comparing the display data in the now buffer 64 and the previous display data in the previous buffer 66, the controller 60 detects differences and transmits those differences to the external device 44 via the interface 30. By controlling the data flow in this manner, the controller 60 may keep the external device 44 updated with all differences in the display data, thereby enabling emulation of the operation of a video monitor by the external device 44.

Where the adapter 10 is utilized to emulate the operation of a keyboard, the controller 60 controls data flow from the external device 44 to the computer 12. Where the external device 44 is transmitting keyboard data to the adapter 10, the controller 60 detects the arrival of keyboard data at the interface 30. Before transmitting the keyboard data from the interface 30 to the data link 22, the controller 60 may determine that the keyboard data received from the interface 30 is not in a format acceptable to the keyboard port 24. In such a case, the controller 60 may convert the keyboard data to an acceptable format. A more detailed description of this conversion process is provided below in connection with FIG. 6. When the controller 60 has determined that the keyboard data is in an acceptable format, the controller 60 causes the keyboard data to be transmitted to the keyboard port 24.

A Method for Transmitting Display Data

Figure 4:
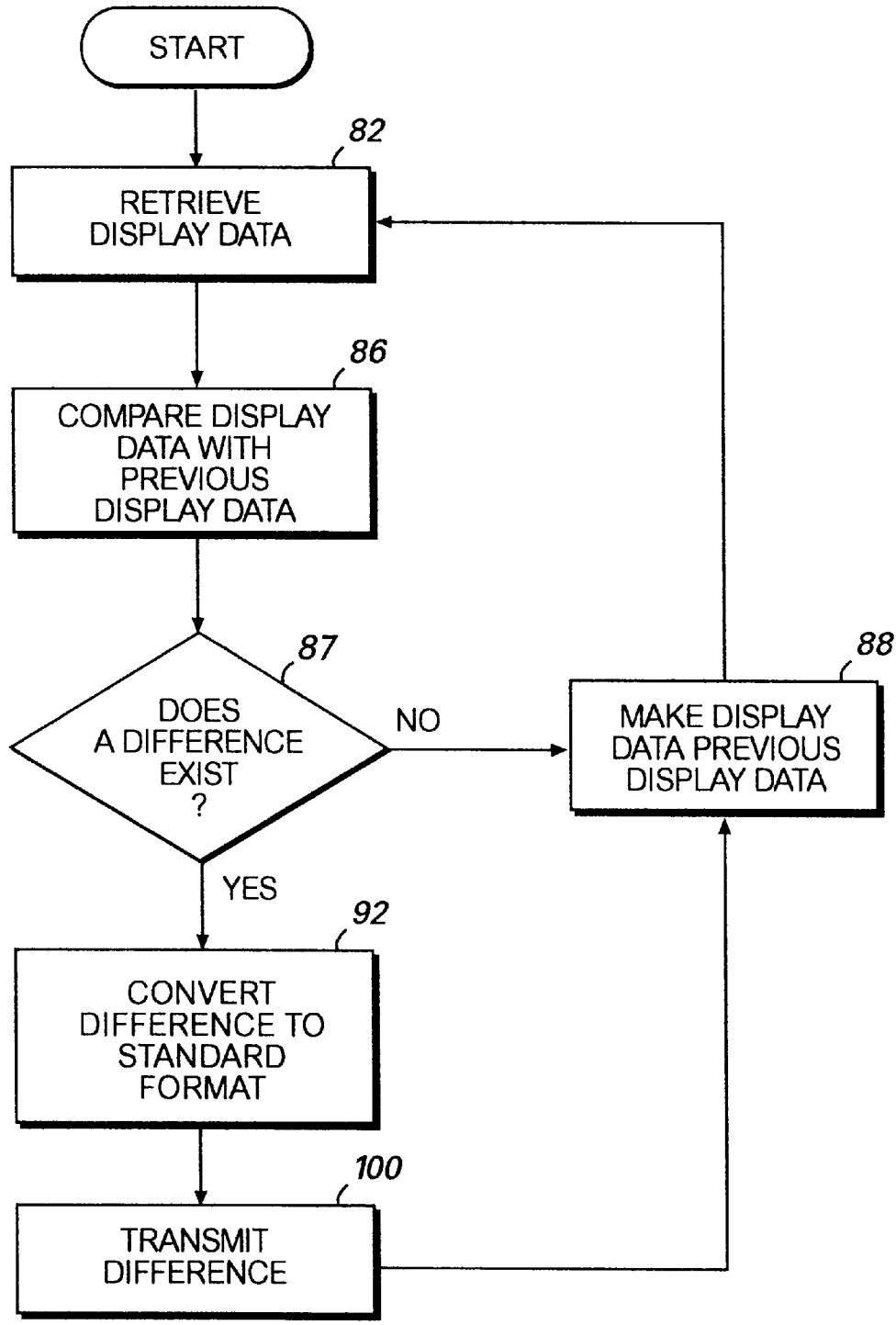
FIG. 4 is a flow chart diagram that shows the steps for a method processing and transmitting display data.

Referring now to FIG. 4, a method is depicted, of an exemplary embodiment of the present invention as it may function to process display data. The first step 82 retrieves display data. The next step is to compare this display data with the display data that has been retrieved previously, referred to as previous display data 86. If there are no differences between the display data and the previous display data, the method branches back to retrieve more display data 87. However, before retrieving more display data, the display data is designated as previous display data 88, for a subsequent comparison. The method then branches back to step 82 and retrieves the next set of display data. This cycle is repeated, until the comparison step 86 determines a difference between the display data and the previous display data.

Where the comparison step 86 determines that a difference exists between the display data and the previous display data, the method branches to transmit the differences. The method may first verify that the differences are in a standard format 92. More detail concerning this step is discussed in connection with FIG. 5. Once the differences are in a standard format, they may be transmitted 100. Once the differences have been transmitted, the method branches back to step 88 and the display data is designated as previous display data.

It will be appreciated that this method can be applied to all forms of output data generated by a computer. For example, the processing of printer data could be effected by following the same series of steps, and only transmitting a new "page" of printer data when a difference is detected.

A Method for Converting Display Data

Figure 5:
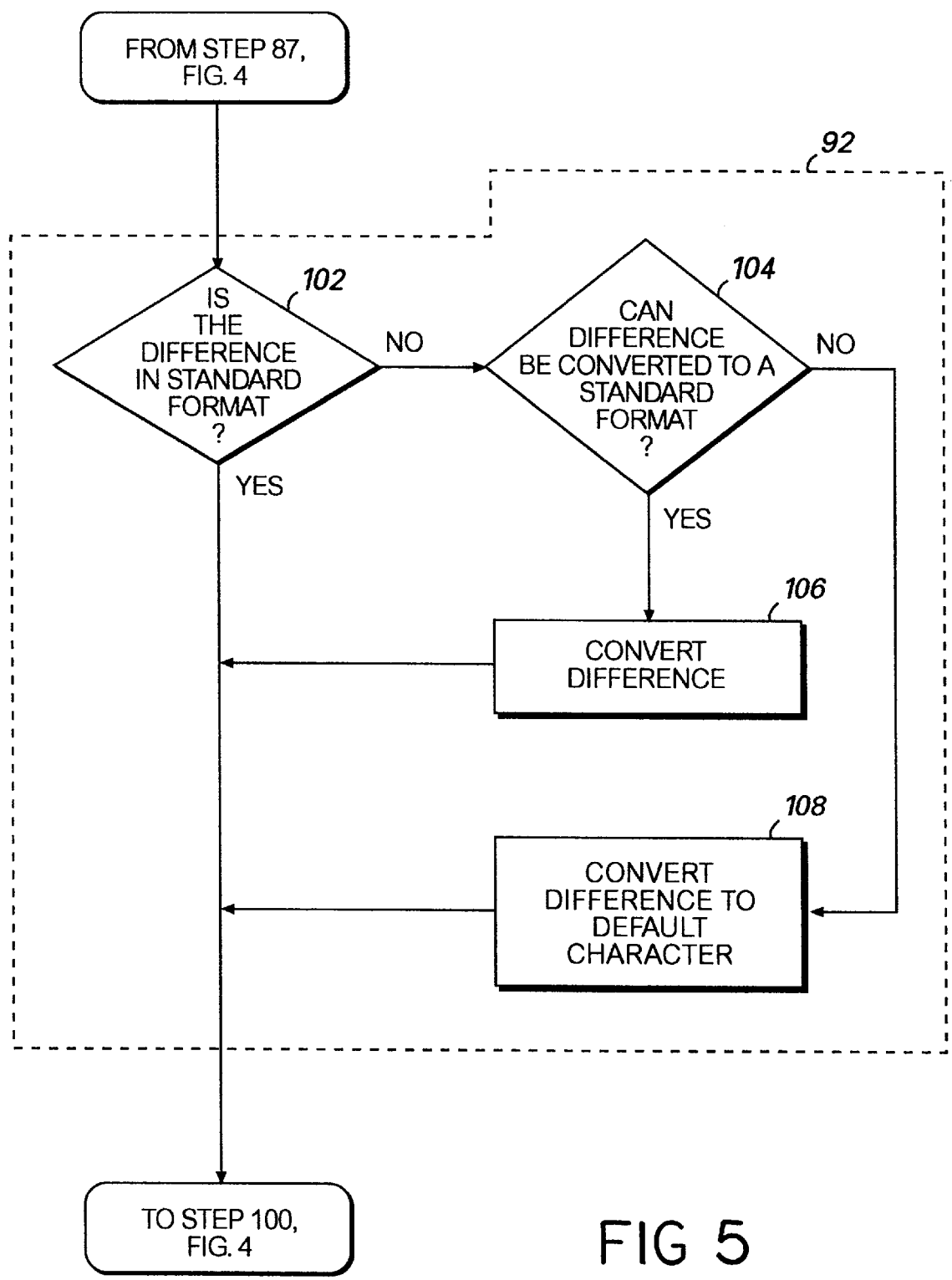
FIG. 5 is a flow chart diagram that shows the steps for a method converting display data for transmission.

Referring now to FIG. 5, the details of an exemplary display data conversion process are now discussed. All of the steps in FIG. 5 are incorporated within Step 92 of FIG. 4. The first step 102 in the conversion process is to determine whether the differences are of a standard format. Where the differences are of a standard format, the method branches to step 100 so that the differences may simply be transmitted. However, where the differences are not in a standard format, the differences must be analyzed.

The American Standard Code for Information Interchange (ASCII) is the most popular data format used by computers for relaying data in digital form. Where the differences are to be transmitted in ASCII format, the first step is to determine whether the differences are in ASCII format. Where the differences are not in a standard format, a conversion step must occur.

Step 102 determines whether the differences are in a standard format. The next step 104 is to determine whether the differences can be converted to the standard format. Where the differences may be so converted, step 106 performs this conversion. Following this conversion, the method branches back to the transmission step 100, as the differences are now prepared for transmission. However, where the display data is in an unknown format, the method branches to step 108 and the differences are simply converted to a default data, such as a space character.

As discussed above in connection with FIG. 2, the transmission step can include the transmission of the text data itself (in ASCII format) as well as the positioning information (as an ANSI escape sequence). The positioning information informs the external device as to the location of the display data text on the remote video monitor or other display device. The relevance of this transmission protocol is made clear by reference to the example of the embedded microcomputer. Where the service technician, in the example, has enabled a portable computer to operate in terminal mode, he or she will have access to the raw display data that is generated by the embedded computer and transmitted over the serial communication interface of the adapter. The ANSI escape sequences will properly position the raw display data on the terminal (i.e., portable computer) screen. Thus, the service technician will have access to a video representation of the embedded computer's output that is substantially identical to that which would otherwise be displayed on a video monitor attached to the embedded computer.

It will be appreciated that this conversion method can be applied to all forms of output data and all data standards. Computers and external devices can apply this method to relay output data in formats other than ASCII for the purposes of emulation. Similarly, other means of positioning the display data can be utilized besides the ANSI 3.64 standard discussed.

A Method for Processing Keyboard Data

Where an embodiment of the present invention is being utilized to emulate the operation of a keyboard, another data conversion process may be appropriate for relaying keyboard data. The steps of this conversion process are now described. In an exemplary embodiment of the invention, one objective of keyboard emulation is to provide the computer's keyboard port 24, with data that is substantially similar to the data that would otherwise be generated by a keyboard connected to the keyboard port 24, with a user actually pressing the keys. In other words, the adapter 10 must convert keyboard data to keystroke data, in order to render the emulation transparent to the computer.

Figure 6:
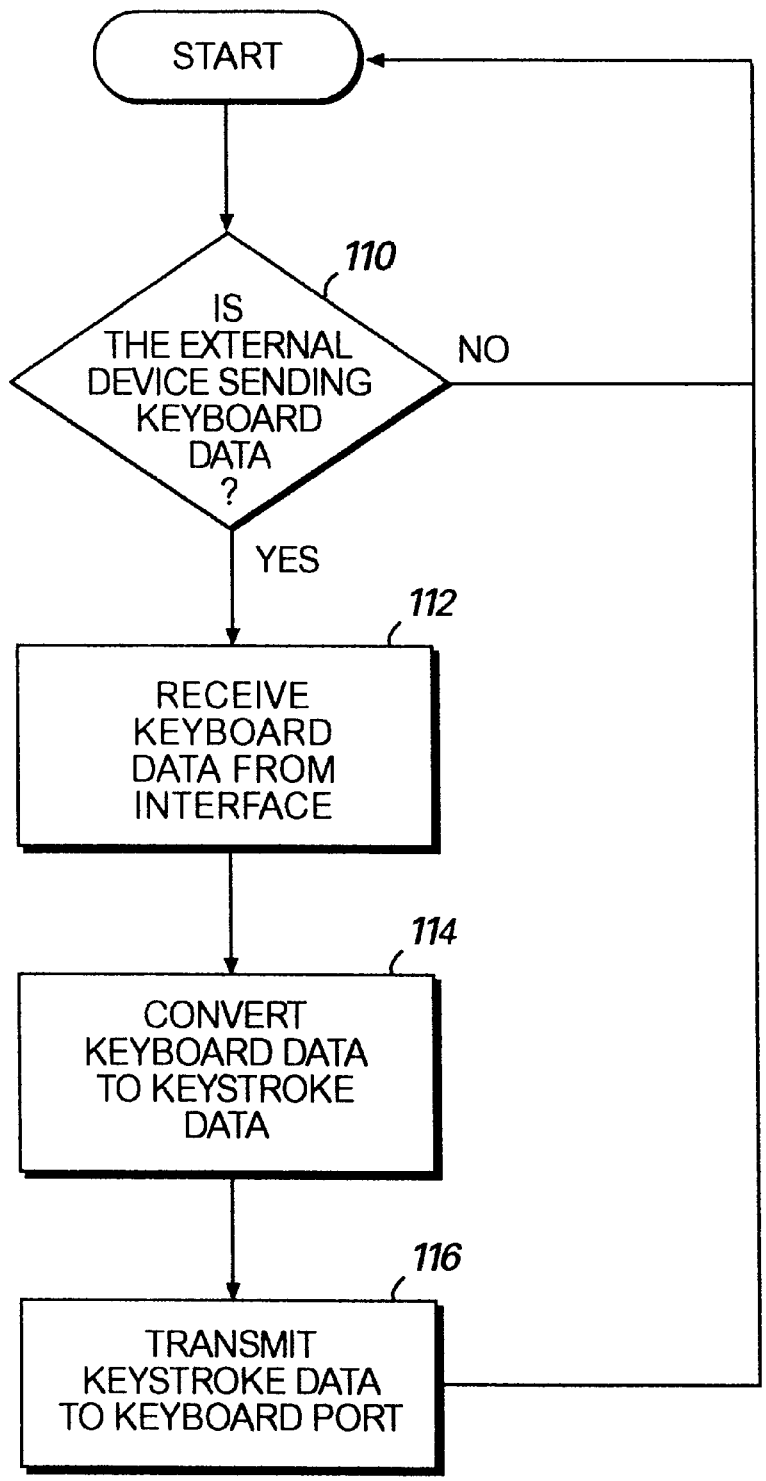
FIG. 6 is a flow chart diagram that shows the steps for a method of processing and transmitting keyboard data.

Referring now to FIG. 6, the first step 110 is to determine whether keyboard data is available for processing. Where keyboard data is available, step 112 receives the keyboard data. The next step 114 is to convert the keyboard data into keystroke data. Keystroke data is used here to mean data in a format or protocol that is acceptable to the keyboard port of a particular computer. Ordinarily, a look-up table procedure can be utilized to correlate received keyboard data to keystroke data for transmission. Once this conversion step is complete, step 116 allows the keystroke data to be transmitted. This process may be repeated indefinitely, as long as the method is being utilized to process keyboard data.

An example of a typical keyboard communication protocol may be found in PHILIPS Application Note AN434, "Connecting a PC keyboard to the I²C-Bus," published in *Application Notes for* 8051-*Based* 8-*Bit Microprocessors*. In short, a keystroke data communications protocol of an exemplary embodiment is generally characterized by having a make code and a break code. The make code is a data packet that is sent to the computer to indicate that a key on the keyboard has been pressed. Each key has its own make code, so that the computer can identify which key has been pressed. Each key also sends a unique break code data packet, when the key is released.

In this embodiment, the adapter presents itself to the computer as if it were an actual keyboard. The adapter receives ANSI 3.64 and ASCII data from the external device over the adapter's serial interface. The adapter converts the ASCII and ANSI data into simulations of keystrokes to emulate the effect of a user pressing keys on an attached keyboard. The adapter sends a make code for the representative key to the keyboard port, followed by the break code (the break code for a key is its make code, preceded by a predetermined flag code). This simulates what would occur if a key on an attached keyboard were depressed and released by the user.

This embodiment transmits the make and break codes to the computer over the keyboard data link. The adapter stores arriving keyboard data in a buffer to be subsequently transmitted as keystroke data to the computer. If more keyboard data is received over the serial interface than can be stored and transmitted over the keyboard data link to the computer, then an overrun condition occurs. During the overrun condition, the adapter will replace received keyboard data with an overrun code. If more keyboard data arrives before the computer allows the adapter to resume sending output data, then the subsequently received keyboard data will be lost. When the computer permits the adapter to transmit more keystroke data following an overrun condition, then the data stored in the buffer will be transmitted to the computer, and normal operation will be restored.

This is but one example of keystroke data. Those of ordinary skill in the art will recognize that the conversion method described above is applicable to convert keyboard data into keystroke data, regardless of the protocol required by either data type.

Of course, this keyboard data conversion method may be omitted, where a communications protocol enables the keystroke data generated by the remote user to be transmitted in keystroke data format, such that the computer receives keystroke data. This conversion method is primarily utilized where the communications protocol requires a format other than that required by the computer and/or generated by the remote user.

SUMMARY OF THE DETAILED DESCRIPTION

Those skilled in the art will understand how the described embodiments of the present invention enable the emulation of a computer's peripheral devices. While the above descriptions have been directed toward keyboard and video monitor emulation, it is to be understood that the methods and apparatus described herein could be used to emulate other peripheral devices. The present invention enables the reception and transmission of input and output data in a way that enhances emulation by minimizing the interruption of computer operations. However, the advantages of the present invention are not limited to keyboard and video monitor emulation, but are applicable to the emulation of virtually any device which communicates data with a computer.

The present invention represents an improvement over the prior art because it permits a user to emulate the peripheral devices at substantially all times that the computer is operative. For example, this means that the user has the ability to receive and remedy warning messages as soon as the computer is operative (i.e., directly following boot-up). As described above, this feature may provide a critical advantage, where the computer is accessed by users at remote sites. The present invention provides virtually instantaneous emulation to a remote user or a nearby service technician that might otherwise have to wait for the execution of an initialization procedure or other configuration before gaining access to the computer.

The present invention also represents an improvement over the prior art in that it permits a user to operate a computer without an attached keyboard or video monitor. Where the computer is being used in an application where these peripheral devices are unneeded or unwanted, this aspect of the invention is a great asset to the user. This feature saves the user the cost of purchasing and maintaining such unnecessary peripheral devices. By enabling the omission of the emulated peripherals from the computer system, this feature also prevents unwanted input or output from occurring. Moreover, because of the configuration of the present invention, this feature is provided even for commercially available microcomputers that are otherwise ill-equipped to operate without a connected keyboard and/or video monitor.

In all cases it is understood that the above-described embodiments are merely illustrative of the many possible specific embodiments which represent applications of the present invention. Numerous and varied other embodiments can be readily devised in accordance with the principles of the present invention without departing from the spirit and scope of the invention.

What is claimed is:

1. An adapter for use with a computer having a keyboard port, for enabling the computer to receive keyboard data other than through a keyboard, the adapter comprising:

a controller that is not part of a keyboard;

a data link that is not part of a keyboard; and an interface operative to receive the keyboard data from an external device and to provide the controller with access to the keyboard data;

the controller being operative to receive the keyboard data and to cause transmission of the keyboard data to the data link;

the data link being operative to receive the keyboard data from the controller and to provide the keyboard data to the keyboard port at substantially all times that the computer is operative; and the data link having a functional connection to the keyboard port, and the data link being further operative to cause the computer to enable the keyboard port, whereby the keyboard data is received by the controller, and transmitted to and through the data link to the computer in place of being received and transmitted through a keyboard, and whereby the functional connection of the data link to the keyboard port causes the computer to enable the keyboard port.

2. The adapter of claim 1, wherein the computer generates output data, and wherein the controller is further operative to receive and to process the output data at substantially all times that the computer is operative.

3. The adapter of claim 2, wherein the output data is display data.

4. The adapter of claim 3, wherein the computer comprises a computer memory for storing the display data, and wherein the controller is further operative to cause retrieval of the display data from the computer memory and to cause transmission of the display data to an external device.

5. The adapter of claim 4, wherein the adapter further comprises an adapter memory, the adapter memory being operative to receive the display data from the controller and to store the display data prior to the transmission of the display data to the external device.

6. The adapter of claim 5, wherein the adapter further comprises an interface, the interface being operative to receive the display data from the adapter memory and to transmit the display data to the external device.

7. The adapter of claim 5, wherein the adapter memory comprises a previous buffer and a now buffer, the now buffer being operative to store the display data, the previous buffer being operative to store previous display data.

8. The adapter of claim 7, wherein the controller is operative to determine differences between the display data in the now buffer and the previous display data in the previous buffer.

9. The adapter of claim 8, wherein the controller is operative to cause transmission of the differences to the external device.

10. The adapter of claim 9, wherein the controller further comprises an interface, the interface being operative to receive the differences from the controller and to transmit the differences to the external device.

11. The adapter of claim 1, wherein the data link comprises a direct connection with the keyboard port, and wherein the direct connection causes the computer to enable the keyboard port.

12. The adapter of claim 1, wherein the controller is further operative to convert the keyboard data to keystroke data and to cause the transmission of the keystroke data to the keyboard port of the computer.

13. An adapter for receiving keyboard data from an external device and for transmitting keyboard data, in place of a keyboard of a computer, the adapter comprising:

a controller that is not part of a keyboard and is not part of the external device;

a data link that is not part of a keyboard;

the controller being operative, at substantially all times that the controller is active, to receive the keyboard data from the external device and to cause transmission of the keyboard data to the data link;

the controller being further operative to electronically identify itself as if the controller were a keyboard; and the data link being operative, at substantially all times that the data link is active, to receive the keyboard data from the controller and to transmit the keyboard data, whereby the keyboard data is received by the controller and transmitted to and through the data link in place of a keyboard.

14. The adapter of claim 13, wherein the computer generates display data, and wherein the controller is further operative to receive the display data from the computer and to cause transmission of the display data to an external device.

15. The adapter of claim 14, wherein the adapter further comprises an adapter memory, the adapter memory being operative to receive the display data from the controller and to store the display data prior to transmission of the display data to the external device.

16. In a system including a computer without an attached keyboard and including an external device, a method for processing keyboard data without the attached keyboard, comprising the steps of:

receiving the keyboard data from the external device;

converting the keyboard data into keystroke data;

providing the keystroke data to the computer; and causing the computer without the attached keyboard to receive the keystroke data at substantially all times that the computer is operative.

17. The method of claim 16, further comprising the step of, before the receiving step, determining whether the external device is sending the keyboard data.

18. The method of claim 16, further comprising the steps of:

retrieving output data from the computer; and transmitting the output data to the external device at substantially all times that the computer is operative.

19. The method of claim 18, wherein the output data is display data.

20. The method of claim 19, wherein the system further comprises a now buffer containing the display data and a previous buffer containing previous display data, and the method, after the retrieving step and before the transmitting step, further comprising the steps of:

copying the display data in the now buffer to the previous buffer;

transferring the display data from the computer to the now buffer; and comparing now buffer contents and previous buffer contents and finding differences therebetween.

21. The method of claim 20, wherein the transmitting step comprises transmitting the differences as the output data to the external device at substantially all times that the computer is operative.

22. A system for enabling a computer, without an attached keyboard, to receive keyboard data, comprising:

a computer having a keyboard port and not having an attached keyboard;

an adapter, functionally connected to the computer, being operative to process the keyboard data by having a controller, and a data link that are functionally connected; and an interface operative to receive the keyboard data from an external device and to provide the controller with access to the keyboard data;

the controller being operative to cause the reception of the keyboard data and to cause the transmission of the keyboard data to the data link;

the data link being operative to receive the keyboard data and to transmit the keyboard data to the keyboard port of the computer;

wherein the data link of the adapter makes a direct connection with the keyboard port of the computer, and wherein the direct connection causes the computer to enable the keyboard port during an initialization procedure, thereby enabling the computer to receive keyboard data without having an attached keyboard.

23. The system of claim 22, wherein the computer generates output data, and wherein the controller is further operative to process the output data at substantially all times that the computer is operative.

24. The system of claim 23, wherein the output data is display data.

25. The system of claim 24, wherein the computer comprises a computer memory for storing the display data, and wherein the controller is further operative to cause the retrieval of the display data from the computer memory and to cause the transmission of the display data to an external device.

26. The system of claim 25, further comprising an interface to transmit the display data to the external device.

27. The system of claim 22, wherein the controller is further operative to convert the keyboard data to keystroke data and to transmit the keystroke data to the keyboard port of the computer.

* * * * *